United States Patent Office 3,291,856
Patented Dec. 13, 1966

3,291,856
RESINOUS CONDENSATION PRODUCT OF AN ETHOXYLINE RESIN AND A POLYALKYL-OL PHENOL
Alfred M. Tringali, Middlesex, and Norman G. Gaylord, New Providence, N.J., assignors to Interchemical Corporation, New York, N.Y., a corporation of Ohio
No Drawing. Filed Mar. 7, 1962, Ser. No. 177,959
4 Claims. (Cl. 260—831)

This invention relates to synthetic resins. More particularly it relates to a new synthetic resin and to novel coating compositions containing said new synthetic resin.

It has been discovered that coating compositions comprising solutions of this new resin in organic solvents provide excellent protective and decorative coatings, especially when used as inside can coatings for food and beverage cans.

The provision of suitable coatings for the insides of metal containers housing foods such as fish foods which are especially reactive with can coatings has existed as a problem in the canning art for many years. In the past, cured coatings of phenolic resins have provided the best solution to this problem. Phenolic resins are fast curing and the cured films have several outstanding properties which make them useful as can linings. These coatings are hard, resistant to sulfide staining (tuna staining) by food products, resistant to softening in the presence of oils and fatty acids, resistant to essential oil, resistant to blushing on processing in steam or water and insoluble in solvents.

Cured coatings of phenolic resins remain deficient in many properties desirable for inside can linings. Coatings of phenolic resins are deficient in adhesion to metal surfaces. Good adhesion is necessary because the coating material is usually applied before the container is fabricated. During fabrication, the container is subjected to a considerable amount of bending and other mechanical forces which act to separate the coating from the surface unless adhesion is good. In addition phenolic resin coatings are generally lacking in flexibility. In fact, they display a brittleness which necessitates their application at low film weights. This results in poor continuity and deformed areas as well as the film being easily scratchable. Further, phenolics are sensitive to oily, oxidized, or otherwise contaminated tin plate. Finally, most phenolic resins tend to give a characteristic flavor to food products, particularly those which contain appreciable amounts of free water. Products containing carbohydrates have also been found to pick up phenolic flavors.

New thermosetting resins have now been discovered which when dissolved in an organic solvent provide inside can coatings for food and beverage cans that overcome to a large extent the above mentioned deficiencies of phenolic resin coatings while maintaining the desirable properties of such coatings.

The new thermosetting resins of this invention are prepared by the condensation, in the presence of an acid catalyst and an aliphatic alcohol, of a polyalkylolphenol having the formula,

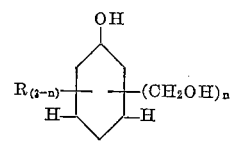

where R is a member of the group consisting of alkyl and hydrogen and $n$ is a number from 2 to 3 and an ethoxyline resin which we will hereinafter describe.

The organic solvent soluble thermosetting resins of this invention provide a significant and patentable advance over the existing art wherein "cold blends" of phenolic and epoxy resins are cured to provide protective coatings. In coatings made by such conventional "cold blending" techniques, the phenolic and ethoxyline resins are not reacted with each other until the blend of these resins is cured by the application of heat to form insoluble set products.

This invention now provides a thermosetting organic solvent soluble resin having both ethoxyline and phenolic components which is formed by the acid catalyzed condensation of an ethoxyline resin with an alkylol phenol. The thermosetting resin of this invention is stable and has a long shelf life. When dissolved in a volatile organic solvent, the thermosetting resin provides a novel curable coating composition which upon baking produces protective and decorative coatings superior to the above described blended coatings.

In preparing these novel resins, Epon ethoxyline resins, particularly "Epon 1004," "Epon 1007," and "Epon 1009," are preferably used. The term Epon is a registered trademark used by the Shell Chemical Corporation to designate a class of ethoxyline resins formed by the reaction of bisphenol A and epichlorohydrin. By referring to Epon resins in the specification, it is not intended to limit the practice of this invention to only these resins. It is merely intended to refer to these Epon resins as a convenient commercial source of the ethoxyline resins preferred in the practice of this invention. It will be obvious to those skilled in the art upon reading the following description and structural formulas of the preferred ethoxyline resins that there exist other commercial resins having the preferred structure and properties. Ethoxyline resins having these desired properties include other commercial resins such as the Ciba "Araldite," the Jones-Dabney "Epi-Rez" and the Reichhold "Epotuf" series.

The ethoxyline resins used in this invention are conventionally prepared by reacting a polyhydric phenol, particularly Bisphenol A (a commercial product consisting of mixed isomers of dihydroxydiphenyl dimethyl methane with epichlorohydrin). By regulating the proportions of these two reactants, the molecular size and the molecular structure of the ethoxyline resins produced may be controlled. By reacting increased quantities of Bisphenol A, the high molecular weight solid ethoxyline resins are produced. Epons 1004, 1007 and 1009 are such high molecular weight ethoxyline resins. Their properties are shown in Table I, which further suggests

TABLE I

| Preferred Resin | Viscosity 22.3° C. | Melting (° C.) | Epoxide equivalent wt. | Hydroxyl equivalent wt. | Avg. Mol. wt. | Hydroxyl functionality | Epoxides per Mol. | Alternative resins having same properties |
|---|---|---|---|---|---|---|---|---|
| Epon 1004 | Q-U* | | 95-105 | 175 | 1,350 | 7.75 | 1.3-1.6 | ERL 2003. Araldite 6084. Epi-Rez 530. Epotuf 6304. |
| Epon 1007 | Y-$Z_1$* | 127-133 | 1,550-2,000 | 200 | 2,625 | 13.0 | 1.3-1.7 | Araldite 609. Epi-Rez 540. Epotuf 6307. |
| Epon 1009 | $Z_2$-$Z_5$* | 145-155 | 2,400-4,000 | 200 | 3,875 | 17.5 | 1.3-1.7 | Araldite 6099. Epi-Rez 550. Epotuf 6309. |

*Gardner-Holdt scale.

alternative resins having substantially the same properties. Epon 1004, 1007, and 1009 have substantially the following structure

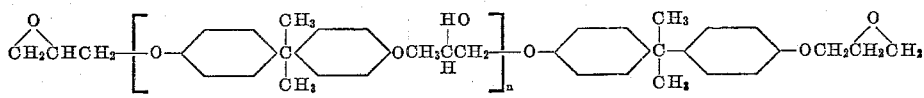

The number of repeating units in the structure determines the average molecular weight. The value of $n$ varies from as low as 3 in Epon 1004 to as high as 14 in the higher molecular weight Epon 1009.

While the above structural formulas show the Epon resins to consist of diepoxy molecules, it should be remembered that neither the Epon resins or other commercially available resins consist entirely of molecules of a single type. Consequently no Epon resin is entirely a diepoxy resin. Side reactions in the preparation of these resins—such as termination of the chain with a bisphenol molecule instead of a epichlorohydrin or conversion of epoxide to glycol reduce the epoxide content. However, for the sake of convenience in description, the ethoxyline resins are referred to and shown as substantially diepoxy resins.

The polyalkylol phenol used in this invention is preferably dimethylol-p-cresol. However, dimethylol-p-t-butyl phenol and trimethylol phenol have also been used to produce resins having the desired properties. It will be understood that related homologs such as dimethylol-o-cresol, dimethylol phenol, or any other polyalkylol phenol prepared by reaction of formaldehyde with a phenol or substituted phenol can readily be used and it is intended that the appended claims will cover such compounds.

The presence of an aliphatic alcohol, during the condensation of said polyalkylol phenol with the ethoxyline resin is very important. While it is preferred to use n-butanol, it will be obvious to those skilled in the art that other related homologs may be used. It has been found that there is a marked tendency for the polyalkylol phenol to undergo homopolymerization to form high molecular weight phenolic resins which become insoluble and non-reactive with our ethoxyline components. The butanol substantially delays such homopolymerization by reacting with the methylol groups on the phenol to produce butoxymethyl groups. While preventing homopolymerization of the polyalkylol phenol, these butoxymethyl groups are reactive with the hydroxyl groups on the ethoxyline resin, thereby permitting condensation of the polyalkylol phenol and the ethoxyline resins. The presence of an aliphatic alcohol such as butanol during the formation of the polyalkylol phenol will act in the same manner to prevent homopolymerization, thus producing a polybutoxymethyl phenol which may be then condensed with the ethoxyline resin.

The preparation of these novel resins may involve a two step process in which the polyalkylol phenol is first prepared and isolated and then condensed with the ethoxyline resin. It has been found, however, that it is more economical commercially to use the one step process described in Examples 1 and 2.

It was further found that in the one step process, it was not necessary to use the same number of moles of NaOH as that of the phenol or substituted phenol in the preparation of the polyalkylol phenol. The use of only a catalytic amount of NaOH will not in any way affect the novel resin.

Baked films of the resins produced by the processes hereinafter described in Examples 1 and 2, wherein catalytic amounts of NaOH were used, were compared to baked films of the resins produced by the processes described in Examples 6 and 7 wherein full amounts of NaOH were used and were found to have identical properties with those of the latter resins.

The following examples will further illustrate the practice of this invention.

EXAMPLE 1

10.84 parts by weight of p-cresol are heated to 51.5° C. under a nitrogen atmosphere. The nitrogen atmosphere is removed and .13 part of 30% aqueous solution of NaOH and 15.03 parts of n-Butylformcel (a product of the Celanese Corporation containing 40% by weight of formaldehyde, 52% butanol and 8% water) are added. The mixture is heated to and maintained at reflux (110° C.) for 1.5 hours. A determination made on a sample taken indicates 56% to 58% of the formaldehyde has reacted. 6.08 parts of n-butanol, 28.09 parts of xylol and 0.13 part of 37% HCl are added. The mixture has a pH of 2-3. 25.26 parts of Epon 1009 (an epoxide resin made from Bisphenol A and epicholorhydrin, having an average molecular weight of 3875, an epoxide equivalent weight of 2400-4000 and a hydroxyl equivalent weight of 220) and 0.42 part of 85% $H_3PO_4$ are added and the mixture is brought to a boil and the water of condensation is decanted. The azeotroping condition is maintained and a sample is removed every hour for a viscosity test until a viscosity of X on the Gardner-Holdt scale is reached. (The sample taken is cut with 17.25% of its weight of butanol in making the viscosity test). It should take 5.5 to 6 hours of refluxing to reach a viscosity of X during which time, the temperature rises to 132° C., 14.01 parts butanol are added, the mixture is cooled and then filtered through a Sparkler Filter. The reaction product has a viscosity of W-Y (Gardner-Holdt) and a total solids content of 39-40% by weight.

To a portion of the resulting resin solution, there is added 1% of $H_3PO_4$ by weight (based on resin solids)

and then the solution is reduced to roller coating viscosity (e.g., 34 to 40 sec. on a #4 Ford cup at 25° C.) with a solvent mixture consisting of 1:1:1 xylene:butanol:diacetone alcohol. The solution is roller coated on 0.25 pound grade of electrolytic tinplate panels to give a dry film weight of 3.5 to 4.0 milligrams per square inch. The solution is also roller coated on black iron panels in the same manner. The panels are then cured by baking at 216° C. for 12 minutes and the baked films were subjected to a series of tests. These tests showed the films to have good fabrication and steam processing resistance, good alkali and pasteurization resistance as well as good resistance to staining by tuna fish. It should be noted here that when $H_3PO_4$ content was increased from 1% to 3%, resistance to tuna stain was increased.

The cured films were subjected to the following tests.

Steam processing resistance is determined by contacting the cured film with steam at 121° C. The films prepared in this example withstood 60 minutes contact without showing any appreciable discontinuity of film or film blush.

Alkaline pasteurization is determined by exposure to an aqueous solution of KOH (300 p.p.m.) at 71° C. Films prepared in accordance with the above example withstood 30 minutes exposure without showing any appreciable discontinuity of film or film blush. By good fabrication resistance, it is meant that flat sheets of tin plate coated with the cured film can be fabricated into can ends without seriously disrupting the film.

Can ends fabricated from the coated tinplate and having the coating inside the can showed good resistance to tuna stain by tuna that had been processed in the can at 121° C. for 90 minutes.

Films prepared from the resin of this experiment were also cured on white enamel panels. These panels showed no discoloration. Similar coatings of films from the resin of this experiment on white enamel which contained 3% $H_3PO_4$, showed slight yellowing.

The results of these tests indicate that cured films of the novel resins of this invention provide very desirable coatings for the insides of food containers.

EXAMPLE 2

10.84 parts by weight of p-cresol are heated to 51.5° C. under a nitrogen atmosphere. The nitrogen atmosphere is removed and .13 part of 30% NaOH and 15.03 parts n-Butyl-formcel (a product of the Celanese Corporation containing 40% by weight of formaldehyde, 52% butanol and 8% water) are added. The mixture is heated to and maintained at reflux (107° C.) for 1.5 hours. A determination made on a sample taken indicated 60% of the formaldehyde has reacted. 6.08 parts of n-Butanol, 28.09 parts of xylol and 0.13 part of 37% HCl are added. The mixture has a pH of 3–5. 25.26 parts of Epon 1007 (an epoxide resin made from Bisphenol A and epichlorohydrin, having an average molecular weight of 2625, an epoxide equivalent weight of 1550–2000 and a hydroxyl equivalent weight of 200) and 0.42 part of 85% $H_3PO_4$ are added and the mixture is brought to a boil and the water of condensation is decanted. The azeotroping condition is maintained and a sample is removed every hour for a viscosity test until a viscosity of S on the Gardner-Holdt scale is reached. (The sample taken is cut with 17.25% of its weight of butanol in making the viscosity test). It should take about 7 hours of refluxing to reach a viscosity of S during which time, the maximum temperature of 132° C. is reached. 14.01 parts of n-butanol are added, the mixture is cooled and then filtered through a Sparkler Filter. The reaction product has a viscosity of S–T (Gardner-Holt) and a total solids content of 39–41% by weight.

To a portion of the resulting resin solution, there is added 1% of $H_3PO_4$ (based on resin solids) and then the solution is reduced to roller coating viscosity (e.g., 34 to 40 sec. on a #4 Ford cup at 25° C.) with a solvent mixture consisting of 1:1:1 xylene:butanol:diacetone alcohol. The solution is roller coated on 0.25 pound grade of electrolytic tinplate panels to give a dry film weight of 3.5 to 4.0 milligrams per square inch. The solution is also roller coated on black iron panels in the same manner. The panels were then cured by baking at 216° C. for 12 minutes and the baked films were subjected to a series of tests. These tests showed the films to have good fabrication and steam processing resistance, good alkali and pasteurization resistance as well as good resistance to staining by tuna fish. It should be noted here that when the $H_3PO_4$ content of the films was increased from 1% to 3%, resistance to tuna stain was increased. The cured films were subjected to the following tests.

Steam processing resistance is determined by contacting the cured film with steam at 121° F. The films prepared in this example withstood 60 minutes contact without showing any appreciable discontinuity of film or film blush.

Alkaline pasteurization is determined by exposure to an aqueous solution of KOH (300 p.p.m.) at 71° C. Films prepared in accordance with the above example withstood 30 minutes exposure without showing any appreciable discontinuity of film or film blush. By good fabrication resistance, it is meant that flat sheets of tinplate coated with the cured film can be fabricated into can ends without seriously disrupting the film.

Can ends fabricated from the coated tinplate and having the coating inside the can showed good resistance to tuna stain by tuna that had been processed in the can at 121° C. for 90 minutes.

Films prepared from the resin of this experiment were also cured on white enamel panels. These panels showed no discoloration. Similar coatings of films from the resin of this experiment on white enamel which contained 3% $H_3PO_4$, showed slight yellowing.

The results of these tests indicate that cured films of the novel resins of this invention provide very desirable coatings for the insides of food containers.

The reaction of this example may use ethoxyline resin: p-cresol in ratios of from 6:4 to 8:2.

EXAMPLE 3

Part A

To a solution of 204 g. 98% NaOH in 1200 ml. of water are added 751 g. of p-t-butyl phenol over a period of 20 minutes while the mixture is continuously stirred under a nitrogen atmosphere and a temperature of 32° to 35° C. 830 g. of 37% formaldehyde are added and the mixture is stirred and maintained at 35°–40° C. for two hours. The organic layer is then separated from the water by means of a separation funnel and then dissolved in 465 g. of xylene and 233 g. of n-butanol. This solution is passed through a separation funnel to remove adhering water from the organic solution. The reaction product has a solids content of 50.3% by weight.

Part B 826 g. of Epon 1009 are dissolved in 826 g. of a solvent consisting of a 2:1 ratio of xylene:butanol. 411 g. of the reaction product of Part A and 10.3 g. of 85% $H_3PO_4$ are added and the mixture is brought to and maintained at a boil (106° C. to 126° C.) for 4 hours during which time, the water of condensation is decanted. The mixture is allowed to cool to 75° C., at which time 518 g. of 2:1 xylene:n-butanol solvent are added. The hot mixture is then filtered through a Buchner funnel. The reaction product has a total solids content of 39.3% and a viscosity of X (Gardner-Holdt).

Baked films of this resin prepared in accordance with the procedure outlined in Example 1 provide desirable coatings for the insides of food containers.

EXAMPLE 4

Part A 1135 g. of 37% formaldehyde are added to a solution of 756 g. of p-cresol, 317 g. of 97% NaOH and 798 g. of water over a period of 15 minutes while maintaining a temperature of 30°–33° C. An ice bath or other cooling means will probably be necessary to maintain the temperature as the reaction is exothermic. The product is flushed with 3 liters of water into a beaker and an amount of glacial acetic acid equivalent to 317 g. of 97% NaOH are added. The product precipitates. The precipitate is filtered and washed with water until it is acid free. Then the product is dried for 5 hours at 80° C.

Part B 124.8 g. of the reaction product of Part A are added to 373.4 g. of Epon 1009, 332.1 g. of xylene and 166.5 g. of n-butanol and the mixture is heated to 76° C. 5 g. of 85% $H_3PO_4$ are added and the mixture is brought to and maintained at boil for 5 to 5½ hours during which time, the water is azeotropically distilled. As the water is distilled, the boiling temperature rises from 111° to 128° C. The mixture is allowed to cool. Upon cooling the reaction product precipitates out. 166 g. of n-butanol are added and the mixture is filtered through a Buchner funnel. The reaction product has a total solids content of 42.5% and a viscosity of 41 poises at 25° C.

Baked films of this resin were prepared and tested in accordance with the procedure outlined in Example 1. They were found to provide the same desirable properties as did the films of Example 1. Therefore, cured films containing the resin of this example provide very desirable coatings for the inside of food containers.

EXAMPLE 5

164.5 g. of Bakelite's BRLA 1030 (70% trimethylolphenol) are added to 560 g. of Epon 1009, 450 g. of xylene and 225 g. of n-butanol and the mixture is heated to 68° C. 6.75 g. of 85% $H_3PO_4$ are added and the mixture is brought to a boil at 94° C. The water of condensation is azeotropically distilled for 5 hours during which time the boiling temperature rises to 123° C. The mixture is then filtered through a Buchner funnel. The reaction product has a total solids content of 39.8% and a viscosity of 27 poises.

Baked films of this resin were prepared and tested in accordance with the procedure outlined in Example 1. While the properties of these films were not as outstanding as those of Example 1, they were found to provide very desirable coatings for the insides of food containers.

EXAMPLE 6

644 g. of 37% formaldehyde are added to a solution of 429 g. of p-cresol, 1287 g. $H_2O$ and 163.7 g. 97% NaOH over a period of 20 minutes at a temperature of 32° C. The mixture is heated to 55° C. 555 g. of xylene, 555 g. butanol (7.5 moles) and 372 g. of 37% HCl are added. The pH is found to be 8. $CO_2$ is added until the pH is lowered to 6. 555 g. xylene, 1000 g. Epon 1007 and 16.7 g. 85% $H_3PO_4$ are added. The solution is brought to a boil (91° C.) and the water of condensation is decanted. The azeotroping condition is maintained for 6 to 7 hours during which hourly viscosity tests are made. When a viscosity of S on the Gardner-Holdt scale is reached (between 6–7 hours), 555 g. of butanol (7.5 moles) are added and the mixture is then cooled and filtered through a Sparkler Filter. The boiling temperature of the mixture reaches a maximum of 134° C. The reaction product has a viscosity of S (Gardner-Holdt) and a total solids content of 38.6% by weight.

Baked films of this resin were prepared and tested in accordance with the procedure outlined in Examples 1 and 2. These films were found to have the same desirable properties as the films in Examples 1 and 2.

EXAMPLE 7

The procedure of Example 6 is repeated using the same reactants except that Epon 1009 is substituted for Epon 1007. In this example, the azeotroping condition is maintained until a viscosity of Z on the Gardner-Holdt scale is reached. The reaction product has a viscosity of Z and a total solids content of 38.0% by weight.

Baked films of this resin were prepared and tested in accordance with the procedure outlined in Examples 1 and 2. These films were found to have the same desirable properties as the films in Examples 1 and 2.

EXAMPLE 8

Part A 660 g. of NaOH, 6840 g. of ice, 1620 g. of p-cresol and 2490 g. of 37% formaldehyde are mixed and maintained at 3° C. for 16 hours, after which, the mixture is maintained at room temperature for an additional 72 hours. $CO_2$ is passed through the mixture until a pH of 9 is reached. The product is separated by means of a Buchner funnel and washed 3 times with water. The product is then dried for 2 days at 45° C. and 2 days at 60° C.

Part B 800 g. of Epon 1004 are dissolved in 965 g. of 2:1 xylene:butanol solution and 200 g. of the product of Part A are added. 8.7 g. of $H_3PO_4$ are added. The mixture is azeotropically distilled between 117°–129° C. to remove water. The mixture is then cooled and 500 g. of a 2:1 xylene:butanol mixture are added. The resinous product is then separated by filtration. The product has a 38.5% solids content and a viscosity of E–F on the Gardner-Holdt scale.

Cured films of the product in an organic solvent provide protective and decorative coatings which, while not attaining the excellent properties of the coatings of Examples 1 and 2, still provide desirable protective and decorative coatings for the insides of metal food containers.

While there have been described what are considered to be the preferred embodiments of this invention, it will be understood that the practice of this invention is not limited to the resins and coatings described in the specific examples but that various modifications may be made therein without departing from the scope of the invention as it is defined in the appended claims.

What is claimed is:

1. An organic solvent soluble thermosetting resin consisting of the acid catalyzed condensation products of an ethoxyline resin having an average molecular weight of 1300 to 4000 and an epoxide equivalent of 870 to 4000 and the general formula

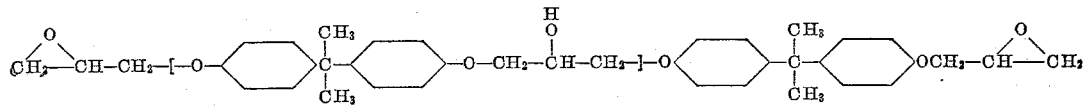

where $n$ is a number from 3 to 14 inclusive and a polyalkylol phenol having the general formula

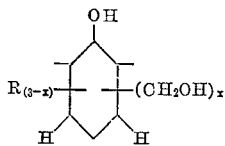

where R is a member of the group consisting of alkyl and hydrogen and $x$ is a number from 2 to 3 inclusive in the presence of butanol.

2. The organic solvent soluble thermosetting resin claimed in claim 1, wherein said polyalkylol phenol is dimethylol p-t-butyl phenol.

3. The organic solvent soluble thermosetting resin claimed in claim 1, wherein said polyalkylol phenol is dimethylol-p-cresol.

4. The organic solvent soluble thermosetting resin claimed in claim 1, wherein said polyalkylol phenol is dimethylol-o-cresol.

References Cited by the Examiner
UNITED STATES PATENTS

| | | | |
|---|---|---|---|
| 2,774,748 | 12/1956 | Howard et al. | 260—837 |
| 2,829,123 | 4/1958 | Tawney | 260—62 |
| 2,838,571 | 6/1958 | Filbey | 260—611 |
| 2,907,725 | 10/1959 | Greenlee | 260—831 XR |

OTHER REFERENCES

"Epoxy Resins" (Lee et al.), published by McGraw-Hill, 1957, pp. 155–157 and 277–279 relied on.

WILLIAM H. SHORT, *Primary Examiner.*

A. H. BRODMERKEL, *Examiner.*

J. W. BEHRINGER, T. D. KERWIN,
*Assistant Examiners.*